United States Patent [19]
Eskildsen et al.

[11] Patent Number: 5,477,368
[45] Date of Patent: Dec. 19, 1995

[54] HIGH POWER LIGHTWAVE TRANSMITTER USING HIGHLY SATURATED AMPLIFIER FOR RESIDUAL AM SUPPRESSION

[75] Inventors: Lars E. Eskildsen, Atlantic Highlands; Per B. Hansen, Bradley Beach, both of N.J.

[73] Assignee: AT&T Corp., Murray Hill, N.J.

[21] Appl. No.: 366,139

[22] Filed: Dec. 29, 1994

[51] Int. Cl.$^6$ .......................... H04B 10/04; H04B 10/17
[52] U.S. Cl. .......................... 359/188; 359/173; 359/179; 359/334; 372/26
[58] Field of Search .................. 359/181, 188, 359/173, 334, 337, 341, 345, 179; 372/31, 26

[56] References Cited

U.S. PATENT DOCUMENTS

| | | | |
|---|---|---|---|
| 5,329,396 | 7/1994 | Fishman et al. | 359/173 |
| 5,373,385 | 12/1994 | Darcie | 359/162 |

OTHER PUBLICATIONS

O. Gautheron et al., "Experimental Investigation of Stimulated Brillouin Scattering and Self–Phase Modulation Effects on Long Distance 2.5 Gbit/s Repeaterless Transmission," *Proc. of 19th European Conf. on Optical Communication*, vol. 2, Sep. 12–16, 1993, Paper No. TuC4.5, pp. 109–112.

*Primary Examiner*—Leslie Pascal
*Attorney, Agent, or Firm*—Gregory C. Ranieri

[57] ABSTRACT

Stimulated Brillouin scattering has been effectively suppressed and the effect of residual amplitude modulation has been mitigated in a dithered optical transmitter by injecting the dithered optical signal into an optical device, such as a highly saturated amplifier, whose small-signal intensity response at the dither frequency dampens the residual amplitude modulation thereby decreasing the eye closure (alternatively, increasing the eye pattern opening). The optical device (e.g., the highly saturated amplifier) exhibits a low frequency cutoff (–3 dB) at a frequency greater than or equal to the inverse of the round trip time for a fiber span with the effective optical transmission length into which the optical signal power is launched. The dither rate is generally in the neighborhood of or below the low cutoff frequency.

12 Claims, 5 Drawing Sheets

HIGH POWER LIGHTWAVE TRANSMITTER USING HIGHLY SATURATED AMPLIFIER FOR RESIDUAL AM SUPPRESSION

TECHNICAL FIELD

This invention relates to an apparatus and a method for transmitting high power lightwave signals and, more particularly, for transmitting signals whose power exceeds the stimulated Brillouin scattering threshold.

BACKGROUND OF THE INVENTION

In optical transmission systems and especially in systems having long unrepeatered fiber spans, it is important to launch as high an optical power into the transmission fiber as possible. Unfortunately, the amount of launch power at a particular wavelength is limited by nonlinear phenomena such as stimulated Brillouin scattering ("SBS"), stimulated Raman scattering, self-phase modulation, four-photon mixing and cross-phase modulation. These phenomena can degrade the optical signals and increase bit error rates for the data.

Narrow linewidth laser sources are particularly vulnerable to SBS problems because the SBS power threshold increases with increasing linewidth of the optical signal being propagated. The SBS power threshold is arbitrarily defined as the input optical pump signal power level at which the powers of the input optical pump signal and the backward Stokes signal become equal. It is well known that dithering of the source optical wavelength for a narrow linewidth source is a useful technique for overcoming the power limitations imposed by SBS. Specifically, the source wavelength can be swept over some narrow band of wavelengths by directly modulating the source laser with a periodically varying dithering current. This technique permits higher launch power to be employed—well above the original SBS threshold for the source without dithering—without incurring the penalty of SBS. Present experiments have shown that a dither rate, for the source wavelength, at or above approximately 5 kHz is effective for suppressing SBS. See, for example, U.S. Pat. No. 5,329,396 issued Jul. 12, 1994.

But, there is one problem for this dither technique. As the dither current sweeps back and forth, it imparts an amplitude modulation at the dither rate. The amplitude modulation varies the envelope of modulated signal. For intensity modulated data, this additional or residual amplitude modulation on the intensity modulated signal penalizes the optical receiver by causing a closure of the eye pattern and thereby increasing the difficulty of discriminating between zero and one optical data bits. In other words, the error rate increases with increasing dither rate. To date, no one is known to have addressed or solved this problem.

SUMMARY OF THE INVENTION

Stimulated Brillouin scattering has been effectively suppressed and the effect of residual amplitude modulation has been mitigated in a dithered optical transmitter by injecting the dithered optical signal into an optical device, such as a highly saturated amplifier, whose small-signal intensity response at the dither frequency dampens the residual amplitude modulation thereby decreasing the eye closure (alternatively, increasing the eye pattern opening). The optical device (e.g., the highly saturated amplifier) exhibits a low frequency cutoff (−3 dB) at a frequency greater than or equal to the inverse of the round trip time for a fiber span with the effective optical transmission length into which the optical signal power is launched. That is, the low cutoff frequency should be greater than or equal to $c/2nL_{eff}$, where c is the speed of light in a vacuum, n is the effective refractive index for the transmission system, and $L_{eff}$ is the effective optical fiber transmission length.

BRIEF DESCRIPTION OF THE DRAWING

A more complete understanding of the invention may be obtained by reading the following description of specific illustrative embodiments of the invention in conjunction with the appended drawing in which:

FIGS. 4A shows an eye diagram for dithered optical transmitters without the highly saturated amplifier, whereas

DETAILED DESCRIPTION

Figure 1:
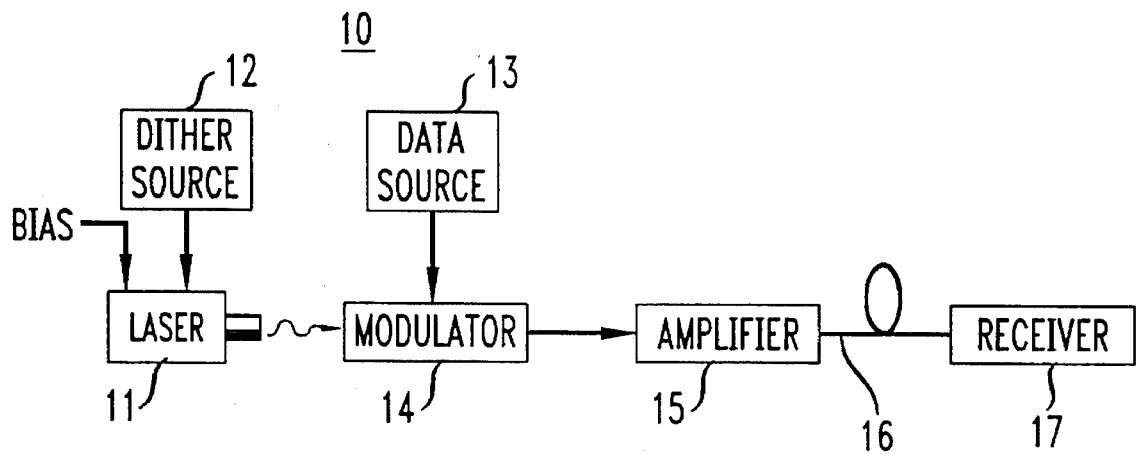
FIG. 1 shows a simplified block diagram of a lightwave transmission system including an illustrative lightwave transmitter realized in accordance with the principles of the present invention.

FIG. 1 shows a block diagram of a transmission system including wavelength dithered transmitter 10, receiver 17, and optical transmission fiber 16 interconnecting the transmitter and the receiver. The transmitter is capable of high power operation without the deleterious effects of stimulated Brillouin scattering and residual amplitude modulation caused by dithering.

Transmitter 10 includes laser 11, dither source 12, a bias, an external modulator 14, and amplifier 15. External modulator 14 receives input data from a data source 13. While the illustrative embodiment of the transmitter shown in FIG. 1 uses external modulation, it is contemplated that the principles of the present invention will extend equally to directly modulated lasers.

Laser 11 is a nominally single frequency laser such as a distributed feedback laser or a distributed Bragg reflector laser or the like. An appropriate current ("BIAS") biases the laser for continuous wave operation. Dither source 12 supplies a periodic variation, such as a sinusoidal or square wave signal, to the bias signal. Alternatively, dithering can be obtained by inducing a local periodic variation of the laser operating temperature.

The effect of either of these dithering techniques is to sweep the optical carrier wavelength of the laser over a particular range of wavelengths at a periodic rate called a dither rate or frequency, $f_d$. The dither signal causes the laser output to be frequency modulated independent of, and in addition to, any other modulation such as analog or digital information encoding. This frequency modulation serves to increase the effective linewidth of the laser output.

It has been shown that a desirable dither frequency is at or above $c/2nL_{eff}$, where c is the speed of light in a vacuum, n is the effective refractive index for the transmission system, and $L_{eff}$ is the effective optical fiber transmission length. $L_{eff}$ can be approximated as $(1-e^{-\alpha L})/\alpha \cong 1/\alpha$, where $\alpha$ is the optical fiber attenuation constant and L is the actual length of optical fiber. Typical systems have $\alpha=0.22$ dB/km and $L_{eff}$ is approximately 20 km. In most system applications, this translates to a dither rate of greater than or equal to approximately 5 kHz.

The minimum dither frequency ensures that the absolute optical frequency of the Brillouin gain is shifted in a time equal to the transit time of the optical fiber. This prevents any significant length of optical fiber from being subjected to a narrow linewidth signal of a particular wavelength for any appreciable amount of time. As a result, the interaction length for the optical signal within the fiber is shortened, thereby inhibiting SBS over the length of the fiber. In accordance with the principles of the invention as described in more detail below, the maximum dither frequency is bounded by the lower cutoff frequency (−3 dB point) for the optical device such as amplifier 15.

Figure 2:
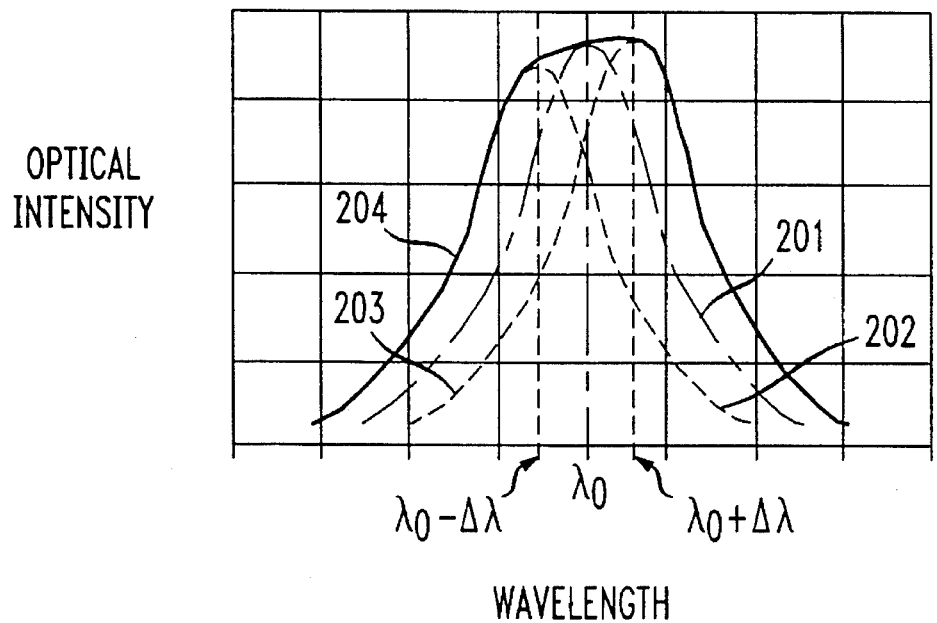
FIG. 2 shows a graphical representation of linewidth broadening for a dithered optical source.

FIG. 2 shows a graphical illustration of the effective linewidth broadening accomplished by dithering the laser bias current. Curves 201, 202, and 203 are representative plots of the optical spectrum (intensity versus wavelength) for a typical single frequency laser biased at some fixed current $I_0$. In normal operation, the laser produces an optical output signal having a fixed linewidth as shown by curve 201 centered about a wavelength $\lambda_o$. When the dither signal is applied the bias current shifts between extremes and the laser outputs signals whose spectra are shown in curve 202 (bias at $I_0-\Delta I$) and curve 203 (bias at $I_0+\Delta I$). As illustrated, each output spectrum is shifted by a wavelength $\Delta\lambda$. When the bias current is dithered so that it cyclically varies between $I_0-\Delta I$ and $I_0+\Delta I$, the laser output when viewed over time appears to have a broadened output centered about $\lambda_o$ and represented by curve 204.

The magnitude of the dither required to effectively suppress SBS depends upon the $\Delta v/\Delta I$ frequency modulation response of the laser, where $\Delta v/\Delta I$ is the change in effective linewidth of the laser output per unit change in the laser bias current. Typical semiconductor lasers exhibit a frequency modulation response between 200 MHz/mA and 1 GHz/mA.

External modulator 14 provides intensity modulation for the output signal from laser 11. Data from data source 13 are encoded in a particular analog or digital format such as NRZ or RZ to create intensity variations in the laser output signal.

Figure 4A:
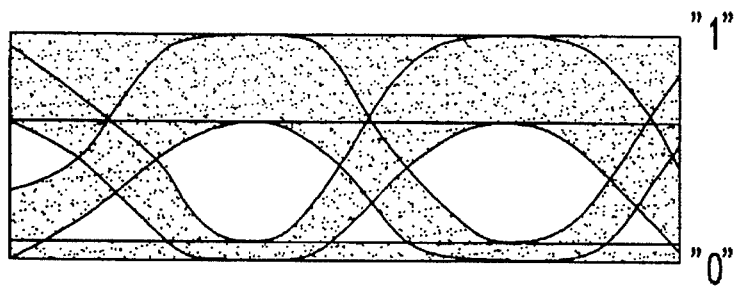

In addition to the intensity variations produced by modulator 14, amplitude modulation ("AM") related to the signal from dither source 12 also appears as a lower frequency intensity variation on the signals output from laser 11 and modulator 14. This additional AM signal is referred to as residual AM. It is this AM signal which corrupts the data received by receiver 17. Eye closure results at the receiver as shown in FIG. 4A for a 10 kHz dither signal.

In order to mitigate the effects of residual AM caused by dithering the laser bias while still retaining the positive results of dithering (namely, suppression of SBS during higher power lightwave transmission), highly saturated amplifier 15 is optically coupled to the modulator output. Highly saturated optical amplifier 15 has a low cutoff frequency $f_c$ which is greater than or equal to $1/T_R$ (where $T_R$ is the round trip transit time) established as $c/2nL_{eff}$, where c is the speed of light in a vacuum, n is the effective refractive index for the transmission system, and $L_{eff}$ is the effective optical fiber transmission length. It should be noted that the dither frequency $f_d$ is also greater than or equal to $c/2nL_{eff}$.

Amplifier 15, in one example from experimental practice, is realized as an erbium doped optical fiber amplifier. Characteristic gain and saturation recovery times of a non-saturated erbium doped optical fiber amplifier are typically on the order of 1 ms. Consequently, such an amplifier has little or no observable variation in the gain level when amplitude modulation of 10 kHz (e.g., residual amplitude modulation from the action of dithering the carrier wavelength of laser 11) is present on the input signal to the amplifier. The characteristic gain saturation and recovery times decrease with increasing levels of gain saturation. Lower limits on the saturation and the recovery times are each on the order of 10 μs. Consequently, the gain of a highly saturated amplifier will not respond to variations in the input signal power on a time scale shorter than approximately 10 μs. However, a 10 kHz residual AM signal injected into a highly saturated amplifier on an intensity modulated signal will experience an intensity dependent gain which will reduce the modulation index of the residual AM.

Figure 3A:
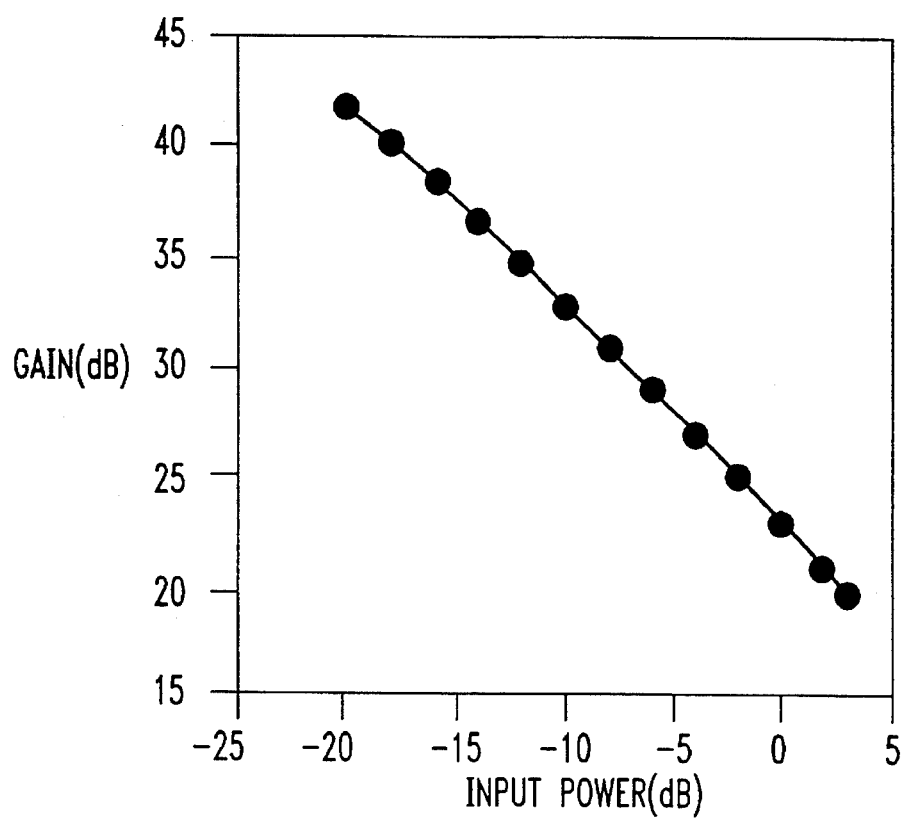
FIGS. 3A–3C show graphical plots of gain versus input power, gain versus output power, and small signal intensity response versus frequency for an exemplary highly saturated optical amplifier suitable for use in the present invention.
Figure 3B:
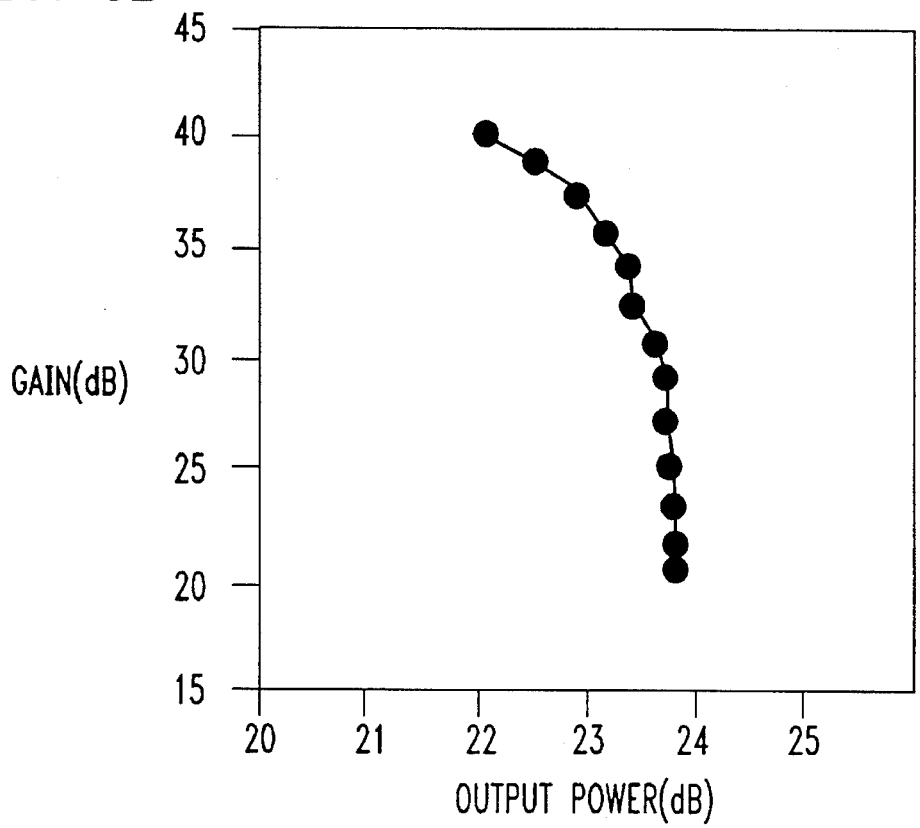
Figure 3C:
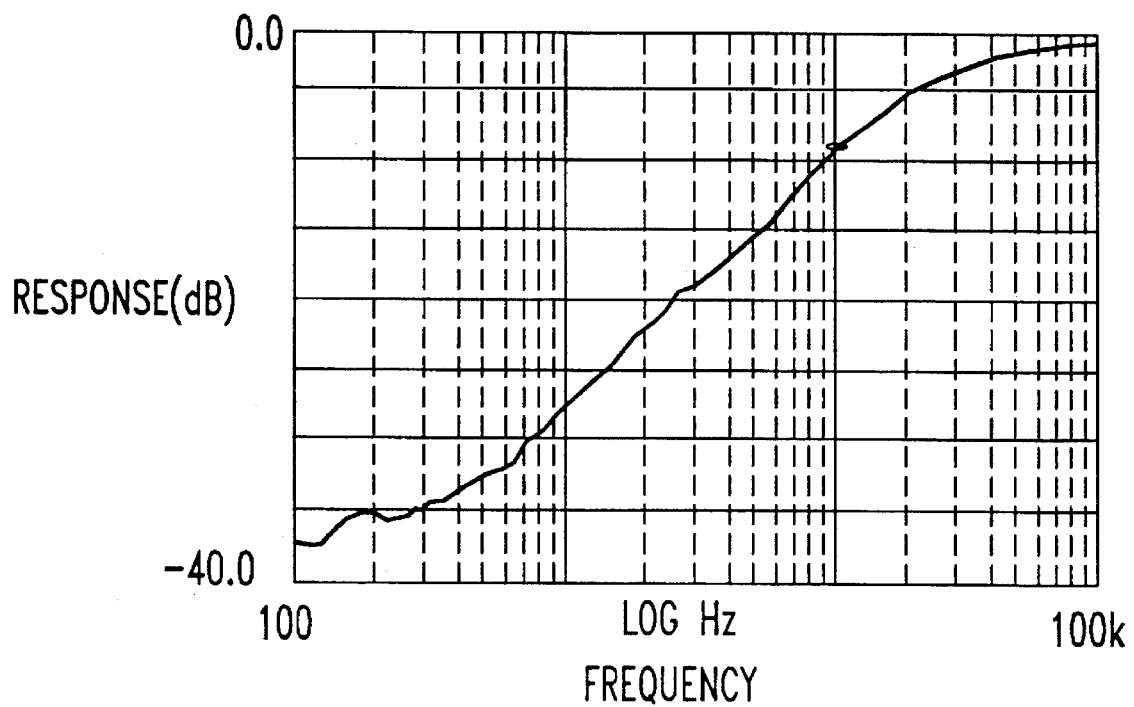

FIGS. 3A through 3C show gain characteristics for an exemplary highly saturated erbium doped fiber amplifier suitable for use in the present invention. FIGS. 3A and 3B show the relationship of gain to input power and output power, respectively. FIG. 3C shows the small signal intensity response as a function of the frequency of the input signal measured via a square-law detector. In this FIG., arbitrary units are shown and there are 5 dB/division along the ordinate. As shown in this FIG., useful dither signal frequencies from 5 kHz to almost 30 kHz are below the low cutoff frequency of the amplifier. That is, they are at frequencies where the small signal intensity response is approximately 3 dB or more below the peak response above dc for the amplifier.

Figure 4B:
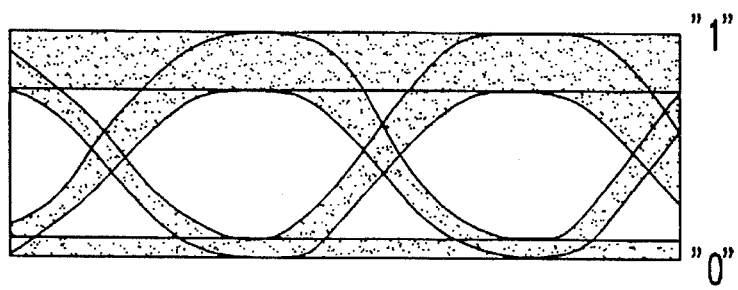
FIGS. 4B–4D show eye diagrams at various dither rates for dithered optical transmitters including the highly saturated amplifier.
Figure 4C:
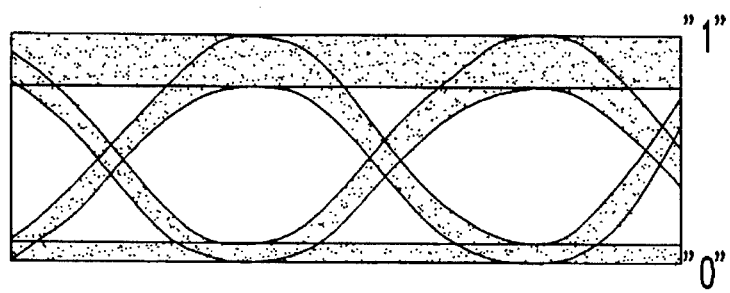
Figure 4D:
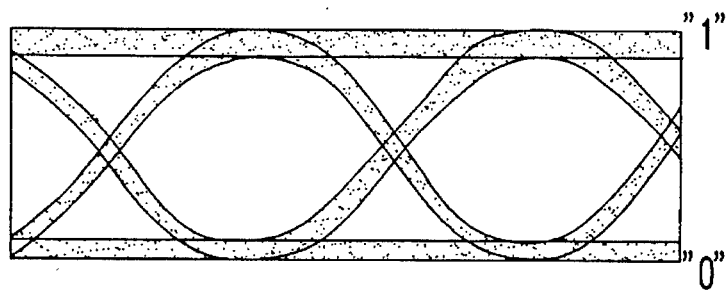

In one example from experimental practice, laser 11 was a distributed Bragg reflector laser operating at 1558 nm. A 10 v (peak-to-peak), 5 kHz signal from the dither source applied through a resistive connection to the laser achieved 10 kHz of dithering in the laser output by means of heating the laser diode (temperature dithering). The laser output was broadened to 12.5 GHz as a time-averaged FWHM measurement. In a second example from experimental practice, a 24 mA peak-to-peak 10 kHz current was superimposed on the dc bias of a DBR laser to obtain a laser linewidth broadening of 8.65 GHz. A 2.488 Gbps pseudo-random bit sequence data signal was applied to a LiNbO$_3$ Mach-Zehnder external optical intensity modulator. Prior to amplification, the modulated signal showed significant eye closure from the residual amplitude modulation caused by dithering. See FIG. 4A where the logical "1" rail is thickened thereby forcing the eye pattern to be more closed than expected. By passing this signal through the amplifier described above (see FIGS. 3A–3C), it is possible to restore a significant amount of the eye opening as shown in FIG. 4B. FIGS. 4C and 4D show eye pattern opening improvement as the dither frequency is reduced to 7 kHz and 5 kHz, respectively, under the same other operating conditions.

Figure 5:
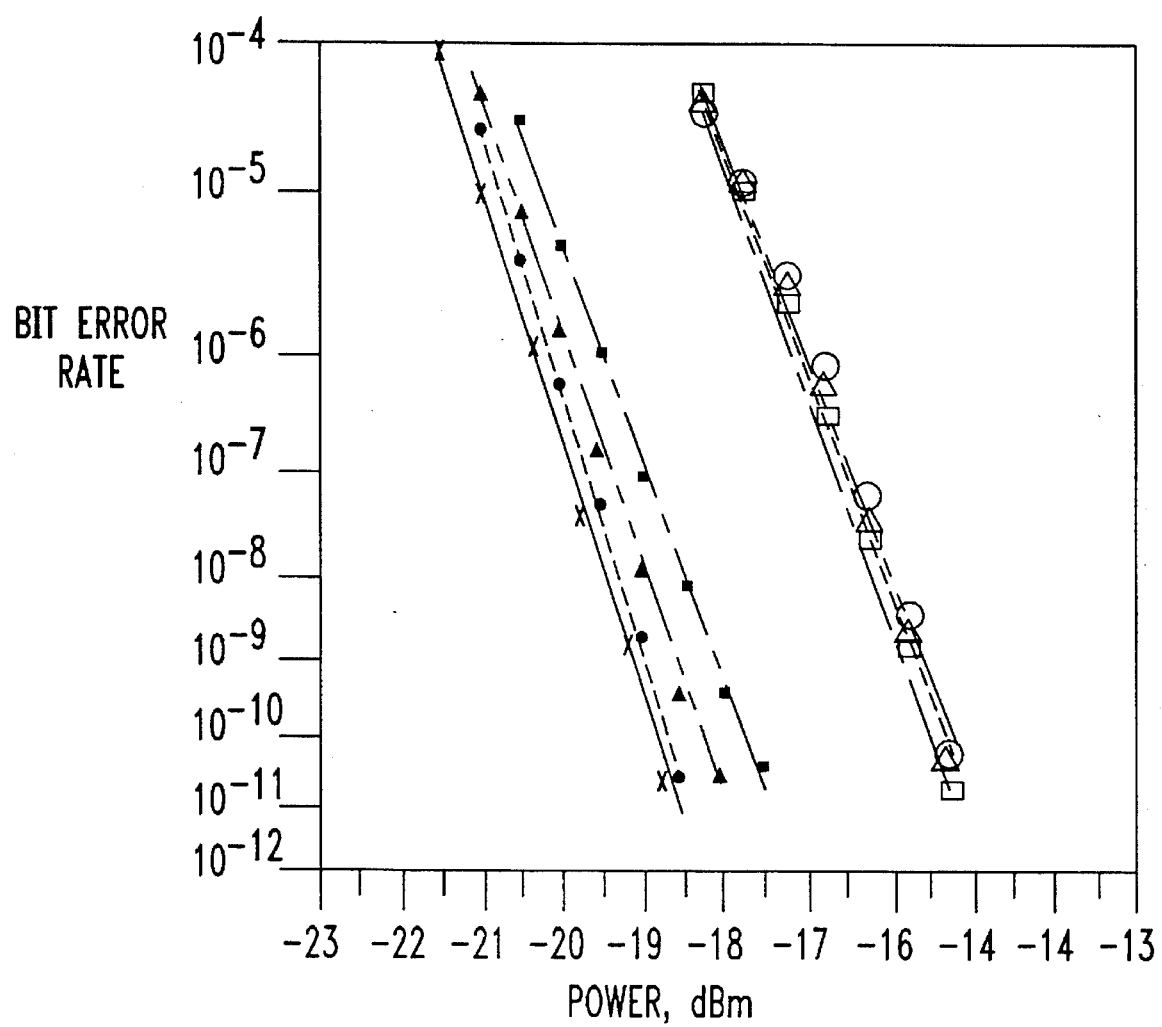
FIG. 5 shows a comparison of experimental results for dithered transmitters with and without the highly saturated amplifier.

FIG. 5 shows a series of curves which depict the relationship of bit error rate to received power. The curves having circular data points employ a 5 kHz dither signal; the curves having triangular data points employ a 7 kHz dither signal; and the curves having square data points employ a 10 kHz dither signal. The curves having hollow square, triangular and circular data points relate to systems wherein transmitter 10 did not include a highly saturated amplifier 15. The curves having filled square, triangular and circular data points relate to systems wherein transmitter 10 included a highly saturated amplifier 15. The solid line curve on the left depicts an undithered transmission condition in which there is no dithering of the laser and the system launch power is less than 5 dBm. All other curves represent a system launch power of approximately 23 dBm.

Conclusions drawn from this experimental system data are that the dithered transmitter which included a highly saturated amplifier offered improved performance over comparable transmitters using dithering alone. Improved performance can be seen as a considerably lower bit error rate (several orders of magnitude lower) for the same received power or a significant power advantage (greater than 3 dB) for the same bit error rate. The latter improvement can be translated into range extension for the system length. It should also be noted that the dithered transmitter utilizing the highly saturated amplifier suffered a small penalty, less than 1 dB, with respect to the undithered system.

Although the dithered transmitter is described above with an erbium doped fiber amplifier, it is contemplated that other amplifiers such as semiconductor amplifiers or Raman amplifiers can be used in the inventive transmitter. It is only required that the particular amplifier satisfy the small signal intensity response condition. Of course, other optical devices may satisfy the response condition above and therefore would be suitable for substitution in transmitter 10 with amplifier 15.

The present invention has been described in terms of reducing the residual amplitude modulation after intensity modulation has been performed. It is contemplated, although not shown in the drawing, that the intensity modulator can be placed after amplifier 15.

As described above, the present invention will retain the positive benefit of dithering the optical carrier wavelength of an optical source without the normally attendant negative feature. That is, the present invention will allow generation and launching of higher than expected power optical signals without experiencing the effects of SBS and with significantly reduced residual amplitude modulation. The present invention improves either range extension, which is important in setting optical fiber span length, or bit error rate for a particular span length. The present invention can also be used to lower the output power and thereby accept a particular bit error rate.

The relationship between the low cutoff frequency and the dither rate, $$\frac{c}{2nL_{eff}} \leq f_d \leq f_c,$$

can be relaxed in that $f_d$ can be less than or equal to $f_c+\epsilon$, where $\epsilon$ is a small frequency change to $f_c$ so that even at the new frequency $f_c+\epsilon$ the small signal intensity response provides an intensity dependent response and suppresses the residual amplitude modulation.

What is claimed is:

1. Optical transmitter apparatus for generating a high power optical signal which is substantially immune from stimulated Brillouin scattering in a transmission medium having a refractive index n and an effective length $L_{eff}$, the apparatus comprising:

a laser having a supplied bias current for generating a continuous wave output signal operating at a predetermined optical carrier wavelength;

means connected to the laser for dithering the optical carrier wavelength of the laser at a periodic rate, $f_d$, said periodic rate being greater than or equal to $c/2nL_{eff}$, where c is the speed of light in a vacuum;

an intensity modulator connected to an output of the laser for varying the intensity of the continuous wave output signal; and highly saturated amplifier means responsive to an output signal from the intensity modulator for reducing a peak-to-peak amplitude of residual amplitude modulation on said intensity modulated output signal, said amplifier means having a low cutoff frequency, $f_c$, being greater than or equal to $c/2nL_{eff}$, and wherein $c/2nL_{eff} \leq f_d \leq f_c$.

2. The optical transmitter apparatus as defined in claim 1 wherein the highly saturated amplifier means is a Raman amplifier.

3. The optical transmitter apparatus as defined in claim 1 wherein the highly saturated amplifier means is a semiconductor amplifier.

4. The optical transmitter apparatus as defined in claim 1 wherein the highly saturated amplifier means is an erbium doped optical fiber amplifier.

5. The optical transmitter apparatus as defined in claim 4 wherein the transmission medium is single-mode optical fiber and the periodic rate is greater than or equal to 5 kHz.

6. The optical transmitter apparatus as defined in claim 1 wherein the dithering means varies the bias current to the laser.

7. The optical transmitter apparatus as defined in claim 1 wherein the dithering means varies an operating temperature of the laser.

8. Method for generating a high power optical signal which is substantially immune from stimulated Brillouin scattering in a transmission medium having a refractive index n and an effective length $L_{eff}$, the method comprising the steps of:

generating an optical output signal having a wavelength which varies at a periodic rate about a predetermined optical carrier wavelength; and reducing a peak-to-peak amplitude of residual amplitude modulation on said optical output signal by amplifying the signal so that the periodic rate occurs in a small signal intensity response region in the neighborhood of or below a low frequency cutoff and above or equal to $c/2nL_{eff}$.

9. The method as defined in claim 8 wherein the step of generating further includes biasing a laser via a bias current to produce the optical output signal and dithering the bias current to the laser at a periodic rate, $f_d$, said periodic rate being greater than or equal to $c/2nL_{eff}$, where c is the speed of light in a vacuum to vary the wavelength of the optical output signal.

10. The method as defined in claim 9 wherein the generating step further includes the step of modulating the intensity of the optical output signal in response to a data signal.

11. Optical transmitter apparatus for generating a high power optical signal which is substantially immune from stimulated Brillouin scattering in a transmission medium having a refractive index n and an effective length $L_{eff}$, the apparatus comprising:

an optical source for generating an intensity modulated output signal having a carrier wavelength which varies about a predetermined wavelength at a periodic rate, $f_d$; and highly saturated amplifier means responsive to the intensity modulated output signal for reducing a peak-to-peak amplitude of residual amplitude modulation occurring substantially related to said periodic rate on said intensity modulated output signal, said amplifier means having a low cutoff frequency, $f_c$, being greater than or equal to $c/2nL_{eff}$, and wherein $c/2nL_{eff} \leq f_d \leq f_c$.

12. Optical transmitter apparatus for generating a high power optical signal which is substantially immune from stimulated Brillouin scattering in a transmission medium having a refractive index n and an effective length $L_{eff}$, the apparatus comprising:

an optical source for generating a continuous wave output signal having a carrier wavelength which varies about a predetermined wavelength at a periodic rate, $f_d$; and highly saturated amplifier means responsive to the intensity modulated output signal for reducing a peak-to-peak amplitude of residual amplitude modulation occurring substantially related to said periodic rate on said intensity modulated output signal, said amplifier means having a low cutoff frequency, $f_c$, being greater than or equal to $c/2nL_{eff}$, and wherein $c/2nL_{eff} \leq f_d \leq f_c$.

* * * * *